(12) United States Patent
Daniel

(10) Patent No.: US 10,010,959 B2
(45) Date of Patent: Jul. 3, 2018

(54) SYSTEMS AND METHODS FOR ASSOCIATING DATA TO A WELDER POWER SOURCE

(71) Applicant: LINCOLN GLOBAL, INC., City of Industry, CA (US)

(72) Inventor: Joseph A. Daniel, Sagamore Hills, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 899 days.

(21) Appl. No.: 13/668,608

(22) Filed: Nov. 5, 2012

(65) Prior Publication Data

US 2013/0119036 A1 May 16, 2013

Related U.S. Application Data

(60) Provisional application No. 61/558,717, filed on Nov. 11, 2011.

(51) Int. Cl.
| | |
|---|---|
| *B23K 9/00* | (2006.01) |
| *B23K 9/09* | (2006.01) |
| *B23K 9/095* | (2006.01) |
| *B23K 9/10* | (2006.01) |

(52) U.S. Cl.
CPC ............ *B23K 9/095* (2013.01); *B23K 9/0953* (2013.01); *B23K 9/10* (2013.01); *B23K 9/1043* (2013.01)

(58) Field of Classification Search
CPC .. B23K 9/0953; B23K 9/1062; B23K 9/1087; B23K 9/0956
USPC ................ 219/130.21, 137 R, 130.5, 130.01
See application file for complete search history.

(56) References Cited

U.S. PATENT DOCUMENTS

| | | | |
|---|---|---|---|
| 4,587,407 A | | 5/1986 | Ahmed et al. |
| 5,500,512 A | * | 3/1996 | Goldblatt ...................... 235/375 |
| 6,091,048 A | * | 7/2000 | Lanouette .............. B23K 9/095 |
| | | | 219/130.21 |
| 6,236,017 B1 | | 5/2001 | Smartt et al. |
| 6,267,291 B1 | * | 7/2001 | Blankenship et al. ........ 235/375 |
| 6,552,303 B1 | * | 4/2003 | Blankenship ........ B23K 9/0953 |
| | | | 219/130.5 |
| 6,570,132 B1 | | 5/2003 | Brunner et al. |
| 6,583,386 B1 | | 6/2003 | Ivkovich |
| 6,744,011 B1 | | 6/2004 | Hu et al. |
| 6,797,921 B1 | | 9/2004 | Niedereder et al. |

(Continued)

OTHER PUBLICATIONS

International Search Report and Written Opinion of the International Searching Authority dated Apr. 8, 2013.

*Primary Examiner* — Dana Ross
*Assistant Examiner* — Lawrence Samuels
(74) *Attorney, Agent, or Firm* — Tucker Ellis LLP

(57) ABSTRACT

The invention described herein generally pertains to a system and method for welder system that associates a set of data to a portion of data collected by a welder power source based on a first indicia and a second indicia. The welder system includes an input device that collects a first input based on the first indicia to identify a type of the set of data and a welder power source to relate the set of data. Moreover, the input device collects a second input based on the second indicia that indicates a location for the set of data. Based on the first indicia and the second indicia, the set of data can be associated with a welder power source or a portion of data collected by the welder power source.

20 Claims, 9 Drawing Sheets

(56) References Cited

U.S. PATENT DOCUMENTS

| | | | |
|---|---|---|---|
| 6,858,817 B2* | 2/2005 | Blankenship | B23K 9/0953 219/130.5 |
| 7,032,814 B2* | 4/2006 | Blankenship | B23K 9/1062 219/54 |
| 7,045,742 B2 | 5/2006 | Feichtinger et al. | |
| 7,523,069 B1 | 4/2009 | Friedl | |
| 7,645,960 B2* | 1/2010 | Stava | B23K 9/1062 219/130.21 |
| 7,768,409 B2* | 8/2010 | Parias | F17C 13/003 340/539.1 |
| 7,873,495 B2 | 1/2011 | Lindell | |
| 2004/0004113 A1* | 1/2004 | Blankenship | B23K 9/1062 235/375 |
| 2005/0199605 A1* | 9/2005 | Furman et al. | 219/132 |
| 2006/0163227 A1* | 7/2006 | Hillen et al. | 219/130.01 |
| 2006/0207980 A1* | 9/2006 | Jacovetty et al. | 219/130.5 |
| 2007/0080151 A1 | 4/2007 | Albrecht et al. | |
| 2007/0080153 A1* | 4/2007 | Albrecht et al. | 219/130.01 |
| 2008/0035727 A1 | 2/2008 | Stanzel et al. | |
| 2008/0061049 A1* | 3/2008 | Albrecht | 219/137 R |
| 2009/0173726 A1 | 7/2009 | Davidson et al. | |
| 2009/0184098 A1* | 7/2009 | Daniel et al. | 219/130.1 |
| 2009/0313549 A1* | 12/2009 | Casner et al. | 715/740 |
| 2010/0217440 A1 | 8/2010 | Lindell | |
| 2011/0114616 A1* | 5/2011 | Albrecht | 219/137 R |
| 2011/0198329 A1 | 8/2011 | Davidson et al. | |
| 2011/0220619 A1 | 9/2011 | Mehn | |
| 2012/0037600 A1 | 2/2012 | Katoh et al. | |

* cited by examiner

SYSTEMS AND METHODS FOR ASSOCIATING DATA TO A WELDER POWER SOURCE

CROSS-REFERENCE TO RELATED APPLICATIONS

This application claims the benefit of priority to U.S. Provisional Application Ser. No. 61/558,717, filed Nov. 11, 2011, and entitled "SYSTEMS AND METHODS FOR IMPLEMENTING A WELDING POWER SOURCE WITH A LOCAL DATABASE OR CLOUD COMPUTING PLATFORM." The entirety of the aforementioned application is incorporated herein by reference.

TECHNICAL FIELD

The invention described herein pertains generally to a system and method that utilizes an indicia to associate a set of data to a welder power source.

BACKGROUND OF THE INVENTION

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a workpiece while current is passed through the electrode and across an arc developed between the electrode and the workpiece. The electrode may be a non-consumable or consumable type, wherein portions of the electrode may be melted and deposited on the workpiece. Often, hundreds or perhaps thousands of welders are employed to drive multiple aspects of an assembly process, wherein sophisticated controllers enable individual welders to operate within relevant portions of the process. For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger manufacturing environments and many times are spread across multiple manufacturing centers. Given the nature and requirements of modern and more complex manufacturing operations however, welding systems designers, architects and suppliers face increasing challenges in regard to upgrading, maintaining, controlling, servicing and supplying various welding locations. Unfortunately, many conventional welding systems operate in individually controlled and somewhat isolated manufacturing locations in regard to the overall assembly process. Thus, controlling, maintaining, servicing and supplying multiple and isolated locations in large centers, and/or across the globe, has become more challenging, time consuming and expensive. Moreover, managing accurate records or data associated with controlling, maintaining, servicing, and supplying multiple locations has become more challenging.

As mentioned, welding environments are often isolated and geographically removed from one another and what is needed is an improved welding architecture to facilitate monitoring, configuration, control, maintenance, and/or supply to multiple welding systems that may be distributed across large areas or regions.

SUMMARY OF THE INVENTION

In accordance with the present invention, there is provided a process for utilizing a set of data with a welder power source comprising the steps of: receiving a first input based on an indicia; identifying a type of a set of data and a welder power source to associate with the set of data based on the first input; receiving a second input based on a second indicia; locating the set of data based on the second input; and associating the set of data to the welder power source based on the first input.

In accordance with the present invention, there is provided a welder system that comprises: a power source that collects a portion of data related to a weld process; an input device that receives a first input defining a type of data and a target power source; the input device receives a second input that is a set of data of the type; a first component configured to associate the set of data to the target power source; and a second component configured to link the set of data to a portion of data collected by the target power source.

In accordance with the present invention, there is provided a welder system that comprises: means for receiving a first input based on an indicia; means for identifying a type of a set of data and a welder power source to associate with the set of data based on the first input; means for receiving a second input based on a second indicia; means for locating the set of data based on the second input; and means for associating the set of data to the welder power source based on the first input.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to methods and systems that relate to relating a set of data to a portion of weld data collected by a welder power source. An input device allows streamlined input of one or more inputs based on an indicia, wherein the inputs and the set of data provided enhances configuration of welder power sources, as well as data aggregation. In an embodiment, the set of data affords additional information to weld data base based on the associated set of data. In another embodiment, the set of data is utilized as a configuration setting for the welder power source. By way of example and not limitation, an input device can be a barcode scanner that reads a first barcode (e.g., first indicia) and a second barcode (e.g., second indicia). The first barcode can define a type of a set of data and a target welder power source (e.g., welder power source to associate the set of data or to utilize the set of data). The second barcode can define a location of the set of data (e.g., the second barcode can point to a storage location of the set of data, the second barcode can include the set of data). Based on the first input and/or the second input, the set of data can be utilized as a configuration setting for the target welder power source or linked (e.g., associated, corresponded, related, among others) to a portion of weld data of the target welder power source.

Figure 1:
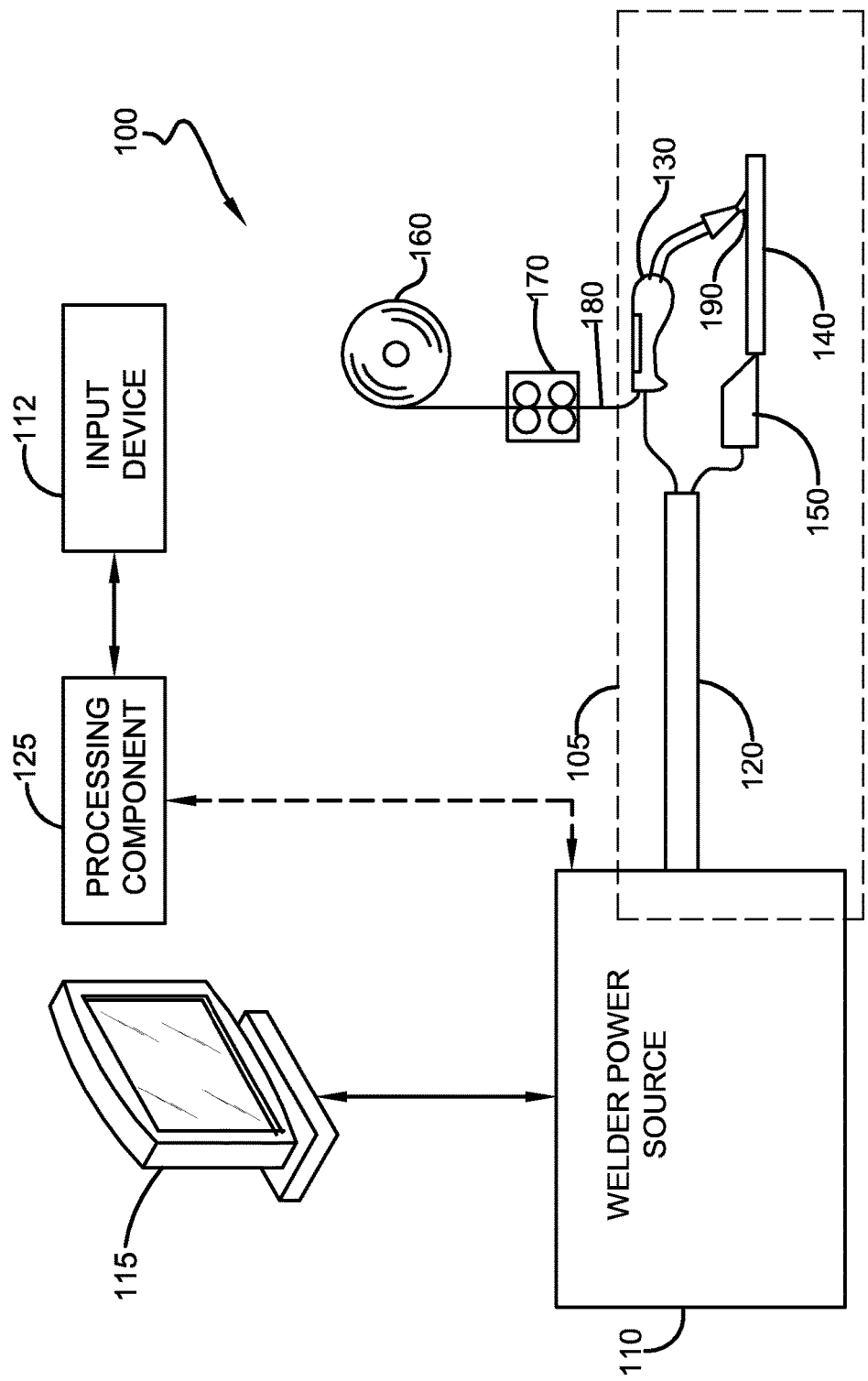
FIG. 1 is a block diagram illustrating a welding system that utilizes a set of data based on an indicia collected from an input device.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIG. 1 illustrates a schematic block diagram of an exemplary embodiment of welding system 100 including welding circuit path 105. Welding system 100 includes welder power source 110 and display 115 operationally connected to welder power source 110. Alternatively, display 115 may be an integral part of welder power source 110. For instance, display 115 can be incorporated into welder power source 110, a stand-alone component (as depicted), or a combination thereof. Welding system 100 further includes welding cable 120, welding tool 130, workpiece connector 150, spool of wire 160, wire feeder 170, wire 180, and workpiece 140. Wire 180 is fed into welding tool 130 from spool 160 via wire feeder 170, in accordance with an embodiment of the present invention. In accordance with another embodiment of the present invention, welding system 100 does not include spool of wire 160, wire feeder 170, or wire 180 but, instead, includes a welding tool comprising a consumable electrode such as used in, for example, stick welding. In accordance with various embodiments of the present invention, welding tool 130 may include at least one of a welding torch, a welding gun, and a welding consumable.

Welding circuit path 105 runs from welder power source 110 through welding cable 120 to welding tool 130, through workpiece 140 and/or to workpiece connector 150, and back through welding cable 120 to welder power source 110. During operation, electrical current runs through welding circuit path 105 as a voltage is applied to welding circuit path 105. In accordance with an exemplary embodiment, welding cable 120 comprises a coaxial cable assembly. In accordance with another embodiment, welding cable 120 comprises a first cable length running from welder power source 110 to welding tool 130, and a second cable length running from workpiece connector 150 to welder power source 110.

Welding system 100 includes input device 112 that collects and/or receives a first input based on an indicia, wherein the first input identifies a type of a set of data and a welder power source to associate with the set of data. For instance, input device 112 can be, but is not limited to being, a barcode scanner, a scanner, a camera, a barcode reader, a numeric detector (e.g., optical character recognition device), a microphone, and the like. Moreover, it is to be appreciated and understood that input device 112 can be utilized by one or more users to provide inputs (e.g., first input, second input) for one or more welder power sources. Further, by way of example and not limitation, the indicia can be a barcode (e.g., a two-dimensional barcode, a three-dimensional barcode, a Quick Response (QR) code, a combination of black and/or white graphics that can be scanned, among others), a radio frequency identification (RFID) signal, a biometric, a magnetic strip reader, a serial number, a wireless signal, among others.

As referenced above, the first input identifies a type of a set of data and a welder power source to associate with the set of data. By way of example and not limitation, the set of data can be or can relate to the following: contact tip replacement; liner replacement; start/stop recording of a condition of a contact tip or a liner for predictive models (e.g., possibly a rating on a scale showing part failure or quality of part); consumable lot code and/or consumable type; with a given consumable type, the available welding modes and operations for a power source (e.g., welder mode A for consumable B, among others) which mitigates setup of welding process and reduces risk of selecting an incorrect welding mode; consumable replaced; record an amount or consumable remaining before replacing (e.g., this information can be used to update density calculation and accuracy of consumable recording calculations); machine calibration (e.g., second input can include information about calibration process such as a previous and final value(s)); push-pull calibration (e.g., pull gun can have a factory calibration indicia with calibration information that is sent to a controlling push system); record reason for welding problem (e.g., oil on part, rusty part, part defective, torch failure, power source failure, fixture failure, part fit-up problem, wrong shielding gas, wrong contact tip, wrong wire, wrong flux, any type of welding problem/failure, and the like); setup welding parameters; recall a WPS (Welding Procedure Specification); recall a part number to weld which then recalls the proper WPS(s) for the part; recall limits and other process monitoring parameters; backup and restore a portion of settings in a welder power source; one to one options/commands (e.g., option/command to one welder power source); one-to-many options/commands (e.g., option/command to one or more welder power sources) such as, for instance, set a time clock in one or more power sources; operator or welder information such as employee identification (e.g., tracking working hours, clock-in time, clock-out time, downtime, breaks, lunch, and other events, and the like); a consumable material for a weld process; a maintenance for a power source; a repair for a power source; an inspection; a welding parameter; a workpiece parameter; among others.

One or more welder power source(s) (e.g., welder power source 110) aggregates data respective to a respective welding process to which the welder power source is providing power to implement. Such collected data relates to each welder power source and is herein referred to as "weld data." Weld data can include welding parameters and/or information specific to the particular welding process the welder power source is supplying power. For instance, weld data can be an output (e.g., a waveform, a signature, a voltage, a current, among others), a weld time, a power consumption, a welding parameter for a welding process, a welder power source output for the welding process, and the like.

Input device 112 receives and/or aggregates a second input based on a second indicia, wherein the second input locates the set of data. In an embodiment, the second input locates the set of data in which the second input is the set of data (e.g., first input provides target welder power source and a type of the set of data and the second input is the set of data). In another embodiment, the second input provides a location for the set of data (e.g., first input provides target welder power source and a type of the set of data and the second input is a database location on where the data can be accessed and/or used). It is to be appreciated that the location of the set of data can be a local storage location, a remote storage location, a cloud storage location, and/or a combination thereof.

Subsequent to receiving at least one of the first input and/or the second input via input device 112, processing component 125 receives and/or aggregates at least one of the identification of the type of the set of data, the welder power source that is to receive the set of data (e.g., a welder power source to which a set of data is to be communicated can be also referred to as a "target welder power source"), the set of data, or a location to obtain the set of data. Processing component 125 associates the set of data (e.g., located via the second input based on the second indicia) to weld data being collected by welder power source 110, wherein the association of the set of data to the weld data for each welder power source can be, but is not limited to being, a tag, a metadata tag, a link, a key, an appending of data, and the like. In an embodiment, processing component 125 communicates the set of data to the target welder power source in which the target welder power source utilizes the set of data as a configuration setting.

In one embodiment, processing component 125 is a computer operable to execute the disclosed methodologies and processes, including methods 800 and 900 described herein. In order to provide additional context for various aspects of the present invention, the following discussion is intended to provide a brief, general description of a suitable computing environment in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with processing component 125.

The processing component 125 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multiprocessor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within processing component 125, such as during start-up, is stored in the ROM.

Processing component 125 can further include a hard disk drive, a magnetic disk drive, e.g., to read from or write to a removable disk, and an optical disk drive, e.g., for reading a CD-ROM disk or to read from or write to other optical media. Processing component 125 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by processing component 125.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), Near Field Communications (NFC), Radio Frequency Identification (RFID), infrared, and/or other wireless media. Combinations of any of the above should also be included within the scope of computer readable media.

A number of program modules may be stored in the drives and RAM, including an operating system, one or more application programs, other program modules, and program data. The operating system in processing component 125 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor (e.g., display 115), or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display (in addition or in combination with display 115) can be employed with processing component 125 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from processing component 125 via any wireless or hard wire protocol and/or standard. In another example, processing component 125 and/or system 100 can be utilized with a mobile device such as a cellular phone, a smart phone, a tablet, a portable gaming device, a portable Internet browsing device, a Wi-Fi device, a Portable Digital Assistant (PDA), among others.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Alternatively or in addition, a local or cloud (e.g., local, cloud, remote, among others) computing platform can be utilized for data aggregation, processing, and delivery. For this purpose, the cloud computing platform can include a plurality of processors, memory, and servers in a particular remote location. Under a software-as-a-service paradigm, a single application is employed by a plurality of users to access data resident in the cloud. In this manner, processing requirements at a local level are mitigated as data processing is generally done in the cloud, thereby relieving user network resources. The software-as-a-service application allows users to log into a web-based service (e.g., via a web browser) which hosts all the programs resident in the cloud.

Figure 2:
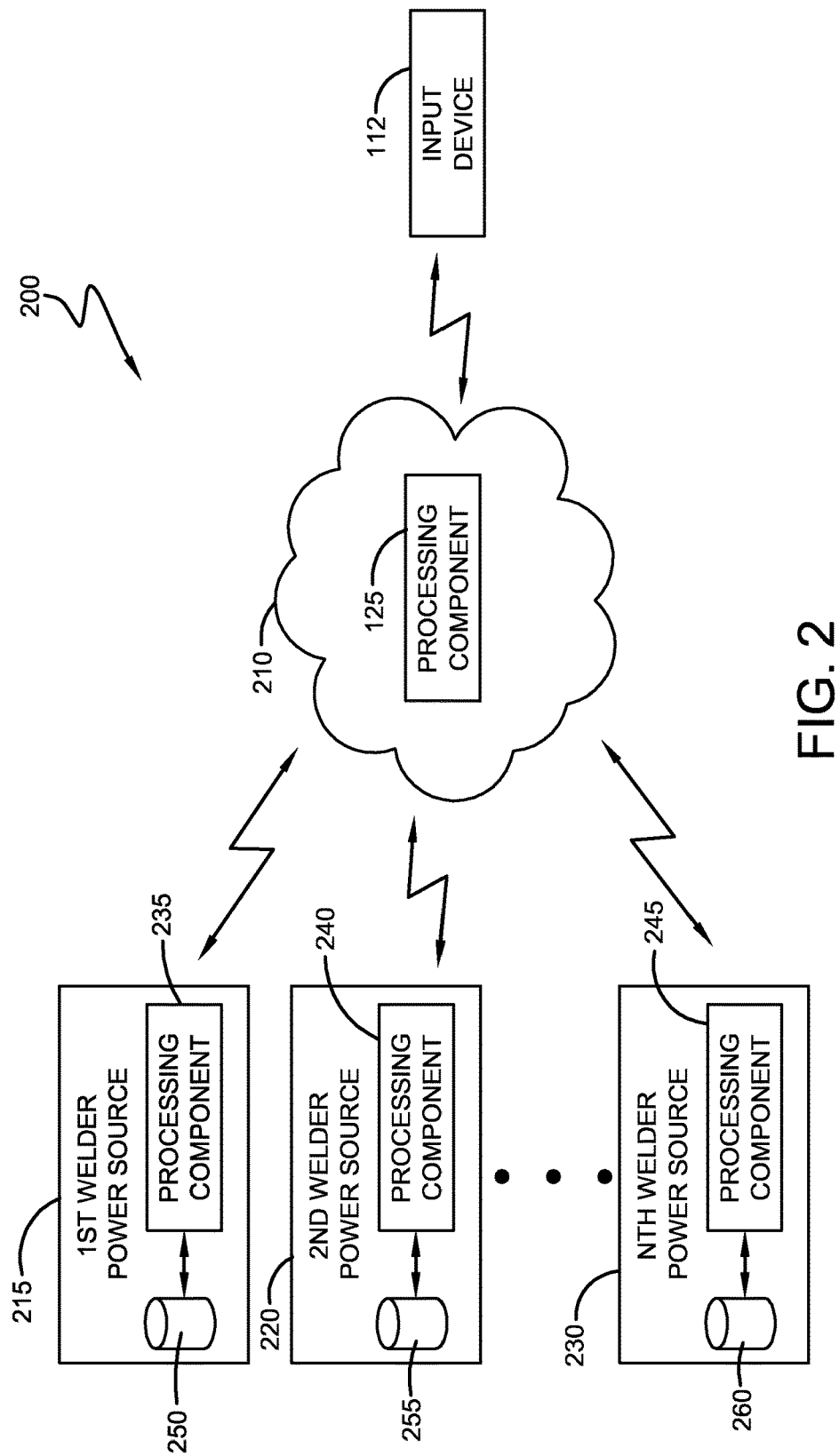
FIG. 2 is a block diagram illustrating a welding environment with a plurality of welder power sources that interface to an input device via a local, remote, or cloud database.

Turning to FIG. 2, system 200 illustrates a welding environment with a plurality of welder power sources that interface to an input device via a local, remote, or cloud database. System 200 includes a plurality of welder power sources such as first welder power source 215, second welder power source 220 to Nth welder power source 230, where N is a positive integer. In an embodiment, each welder power source includes a processing component 235, 240, and 245, that is used to evaluate data related to each welder power source as well as data related to an enterprise-wide welding operation. Data from each processing component 235, 240, and 245 is transmitted to the local or cloud database (e.g., local database, cloud database, remote database, among others) computing platform 210 for further processing.

In an embodiment, each welder power source further includes a local data store. For instance, first welder power source 215 includes processing component 235 and data store 250, second welder power source 220 includes processing component 240 and data store 255, and Nth welder power source 230 includes processing component 245 and data store 260. It is to be appreciated that system 200 includes processing component 125 hosted by computing platform 210 in which each welder power source includes a distributed and respective processing component. Yet, it is to be understood that processing component 125 (and distributed processing components 235, 240, and 245) can be a stand-alone component in each welder power source or a stand-alone component in the computing platform 210.

Each welder power source aggregates or receives weld data or local data associated with a respective welding process that the particular welder power source is supplying power. For instance, welding parameters related to a welding process A is powered by welder power source B such that weld data or local data is collected relating to the welding process A. The weld data or local data for a welder power source is stored in a respective local data store (e.g., data stores 250, 255, and 260). Yet, it is to be appreciated and understood that each welder power source can include a local data store (as depicted), a collective and shared remote data store, a collective and shared local data store, a cloud data store hosted by computing platform 210, or a combination thereof.

Figure 3:
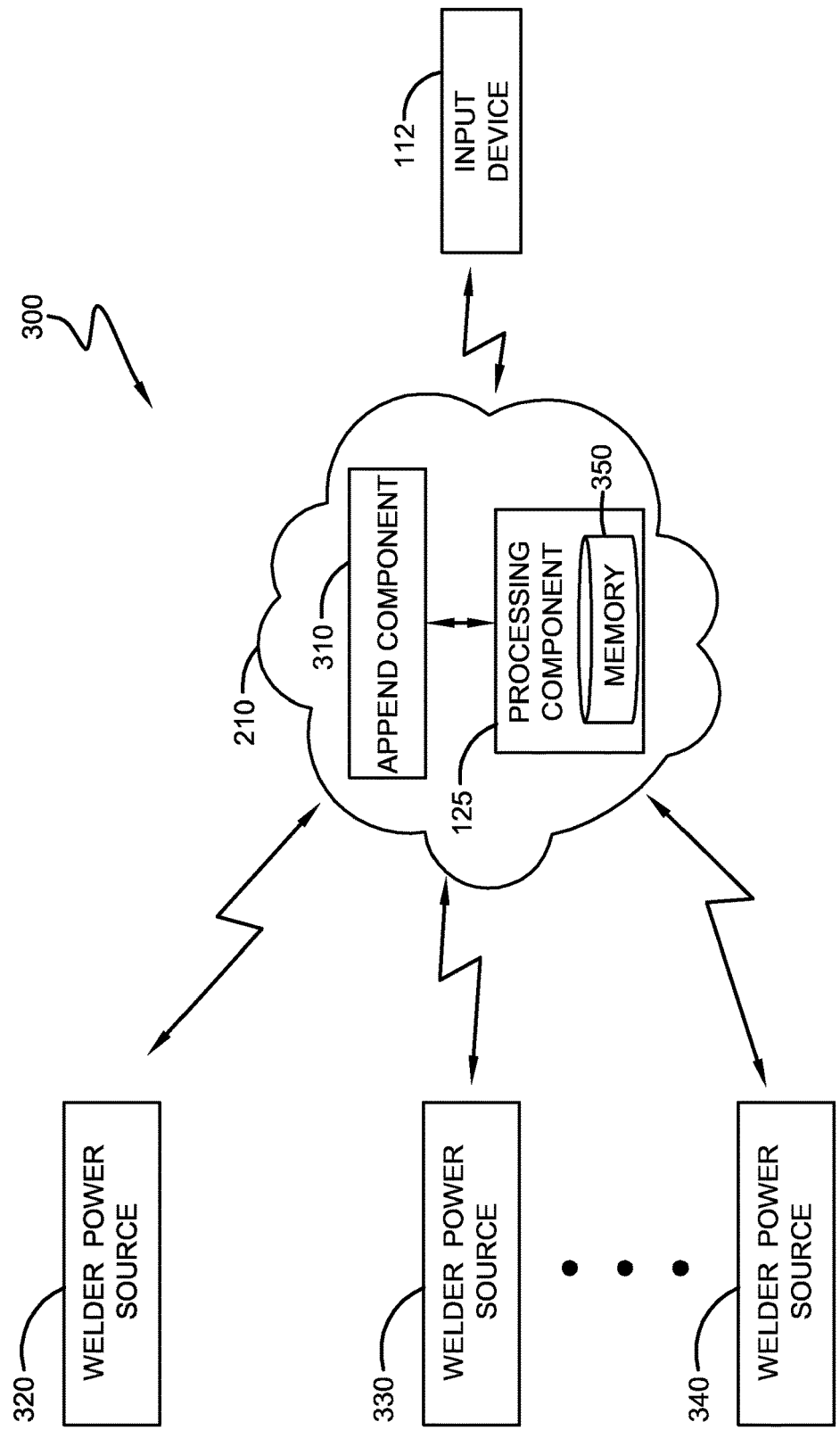
FIG. 3 is a block diagram illustrating a welding system that includes a plurality of welder power sources in which a welder power source data is appended with a set of data located via an input device.

FIG. 3 illustrates welding system 300 that includes a plurality of welder power sources in which a welder power source data is appended with a set of data located via an input device. Welding system 300 includes input device 112 that receives and/or aggregates at least one input based on an indicia. A first input received identifies a type of a set of data and a welder power source (e.g., welder power source 320, 330, and 340) to receive the set of data. For instance, the type of a set of data can relate to, but is not limited to, an employee information, a welding process, a welder parameter, a consumable, a repair, an inspection, a maintenance, a workpiece parameter, among others. Based on the first input, the set of data can be communicated to the target welder power source (e.g., welder power source identified based on first indicia). In an embodiment, the set of data is stored local to the target welder power source. In another embodiment, the set of data is stored remote (e.g., computing platform 210) in relation to the target welder power source and is associated to the target welder power source (e.g., association is a tag, metadata, metadata tag, link, a key, among others).

A second input is received based on a second indicia, wherein the second input and indicia provide a location of the set of data. For instance, the second indicia can be the set of data (e.g., second input is a serial number within a second barcode in which the set of data is the serial number to be communicated to the target welder power source). In another instance, the second indicia can provide a data location for the set of data (e.g., remote location, local location, location other than within the second indicia, among others).

Processing component 125 evaluates the first input and/or the second input in order to communicate the set of data to at least one welder power source. In an embodiment, processing component 125 communicates the set of data to the target welder power source. Yet, in another embodiment, processing component 125 utilizes memory hosted by computing platform 210 in which incoming set of data is stored. Yet, the stored set of data (based on at least one of the first input or the second input) is related to at least one welder power source regardless of a storage location (e.g., local, cloud, remote, among others).

System 300 further includes append component 310 that associates the set of data (e.g., located based on the second input) with a portion of local data (e.g., also referred to as weld data) of the targeted welder power source. As referenced above, each welder power source includes local data or weld data collected for a welding process. Append component 310 can associate the set of data to the local data or weld data for a particular welder power source. Such association enables data collection to be more robust for a particular power source. For instance, input device 112 can relate a set of data to weld data or local data being collected for a particular welder power source, where the set of data would not be collected or associated without input device 112.

Figure 4:
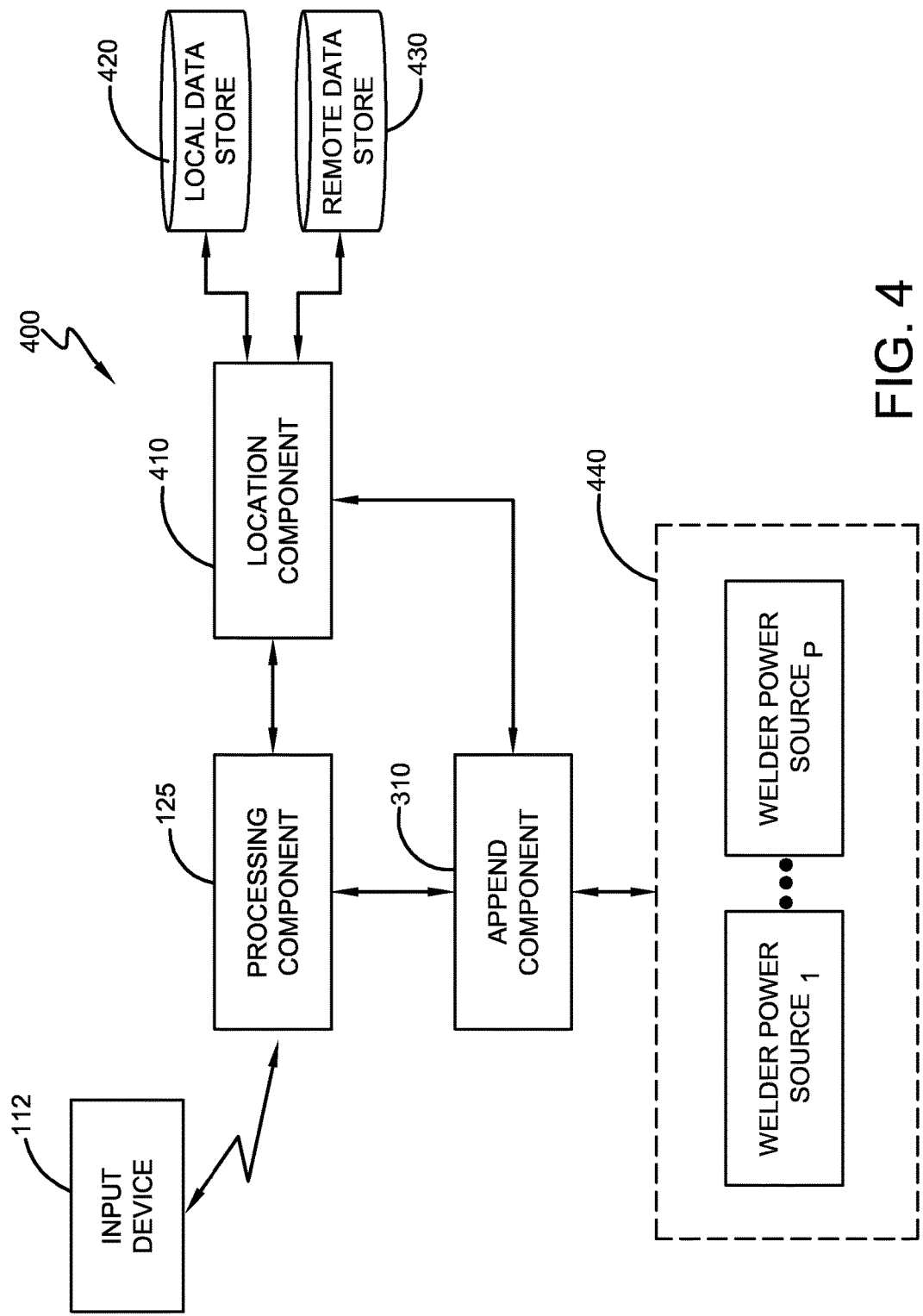
FIG. 4 is a block diagram illustrating welding system that utilizes one or more indicia to identify a type of a set of data and a location for the set of data.

FIG. 4 illustrates welding system 400 that utilizes one or more indicia to identify a type of a set of data and a location for the set of data. System 400 includes input device 112 that receives one or more inputs based on one or more indicia. A first indicia (upon receipt and/or collection) provides a type of a set of data that will be delivered and a target welder power source. A second indicia (upon receipt and/or collection) provides a location for the set of data. Processing component 125 evaluates the inputs via input device 112 to communicate the set of data to the target welder power source or to associate the set of data to the target welder power source. Furthermore, processing component 125 utilizes append component 310 to associate the set of data with a portion of local data or weld data from a particular welder power source (e.g., the welder power source identified with the first indicia). For instance, system 400 can associated one or more sets of data to plurality of welder power sources 440, where there can be a number of welder power sources from welder power source, to welder power source$_P$ with P being a positive integer. Append component 310 relates the set of data to a portion of weld data or local data in which the weld data or local data is based on the target welder power source.

System 400 further includes location component 410 that evaluates the second input based on the second indicia to identify a location for the set of data. In an embodiment, location component 410 ascertains the storage location via the second indicia, wherein the storage location is a data store. For instance, the storage location can be local data store 420 (e.g., local to the target welder power source), remote data store 430 (e.g., remote to the target welder power source), or a combination thereof. Location component 410 accesses the set of data the storage location in order to associate with at least one of the target welder power source or a portion of weld data from the target welder power source. In another embodiment, location component 410 ascertains the location of the set of data to be included within the second indicia received via the second input. For instance, a second indicia can be a barcode that, when scanned, includes the set of data to be associated with at least one of the target welder power source or a portion of weld data from the target welder power source.

In an embodiment, system 400 can associate the set of data to a portion of the weld data based upon receipt of the first input. In an embodiment, system 400 can associate the set of data to a portion of the weld data based upon receipt of the second input. In an embodiment, system 400 can associate the set of data to the welder power source from the second input to a time of a receipt of an additional first input that identifies a type of a second set of data and a welder power source to associate with the second set of data.

For instance, a first indicia can be a barcode instructing an employee identification type of data to be delivered to a welder power source A, wherein welder power source A can collect weld data (also referred to as local data). A user can utilize a barcode scanner or reader to receive the first indicia which indicates an employee identification set of data is to be delivered and such data is to be delivered to the welder power source A. The user can further scan or read a second indicia with the barcode scanner to locate the set of data (here, the employee's identification). Upon receipt, the employee's identification can be associated to at least one of the welder power source A or a portion of weld data collected by the welder power source A. For instance, weld data collected can be tagged or marked with the employee's identification. This combination of the weld data and additional data (e.g. the set of data received via the first input and/or the second input) allows evaluation of a more robust weld data and associated set of data.

For example, a first indicia can define a type that is a welding parameter(s) targeted to one or more welder power sources. Moreover, the second indicia can define the set of data (e.g., one or more welding parameters). In an embodiment, a supervisor can receive the first indicia and the second indicia to configure a plurality of welder power sources with the one or more welding parameters. Thus, the plurality of welder power sources can receive the one or more welding parameters and employ such parameters based on association thereto. The association of the set of data to the targeted welder power source can be at least one of a tagging (e.g., relating the set of data to the target welder power source) or an implementation (e.g., utilizing the set of data as a setting and/or configuration for the target welder power source). Such association can be defined by the first indicia indicating a type of the set of data.

In another example, a welder can use a consumable that requires replenishment. Upon replacement or replenishing the consumable, a first indicia can be received targeting the welder power source for the welder and indicating a type of data that is consumable material replacement. The second indicia can be received that indicates the consumable has been replenished defining a life expectancy or duration of time (e.g., the set of data is defining the consumable replaced as well as the lifespan of the new consumable).

In another example, a welder can require an inspection or a repair. The user can input the first indicia related to a type of data (e.g., an inspection request or a repair request) for a particular welder power source, and the second indicia the user inputs can be the set of data (e.g., the inspection requested or the repair requested) for the particular welder power source. Upon completion of the repair or the inspection, a second set of inputs can be used. The user (e.g., user initially requesting, inspector, repair person) can input a first indicia indicating a type of data (e.g., repair complete or inspection complete) and the target welder power source. The second indicia can be received indicating the set of data (e.g., the repair performed or the inspection performed and results). In an embodiment, the sets of data associated or utilized with the targeted welder power sources can be stored and employed for analysis and/or evaluation.

Figure 5:
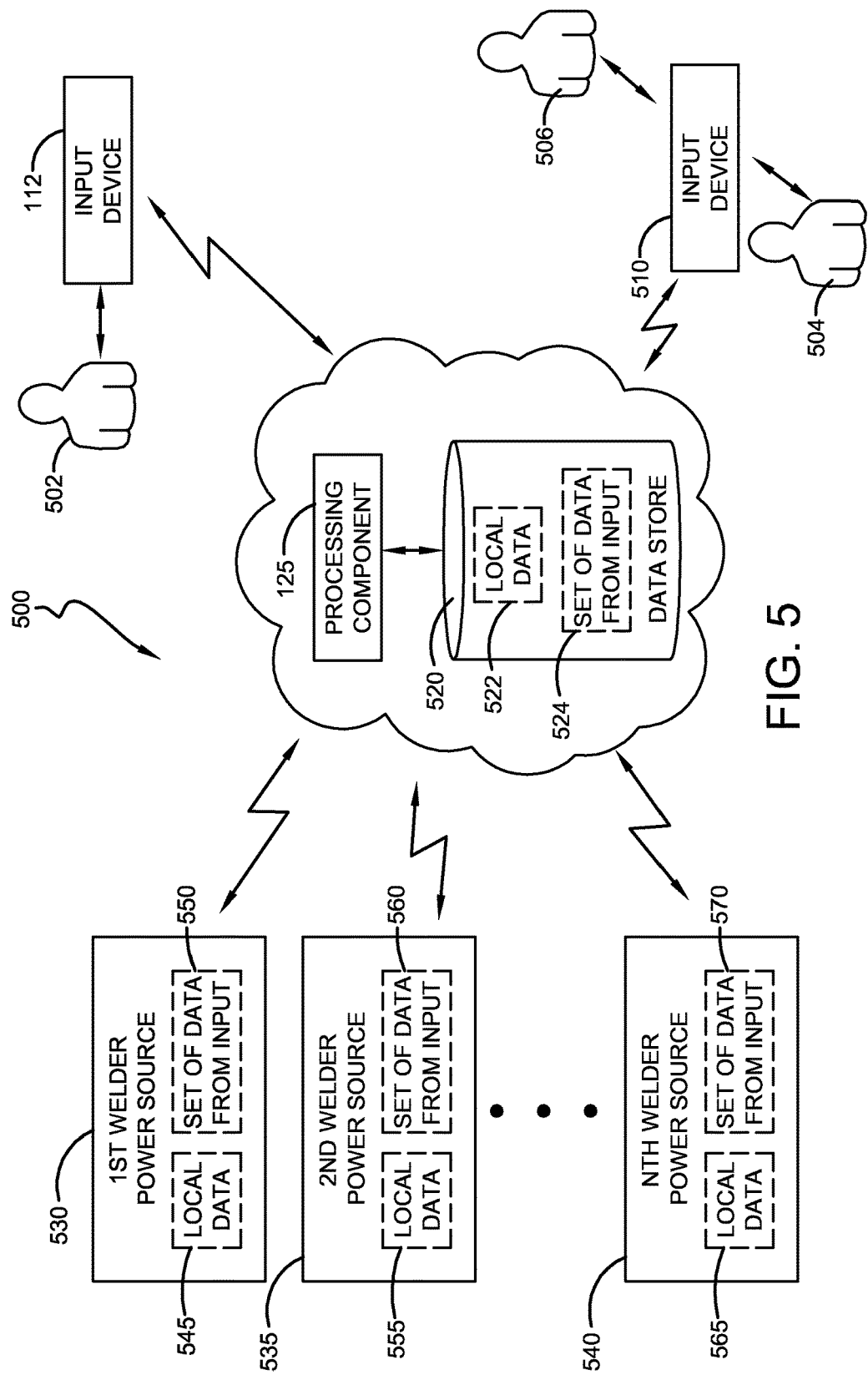
FIG. 5 is a block diagram illustrating a welding system that identifies a set of data to associate with local data related to a power source.

FIG. 5 illustrates welding system 500 that identifies a set of data to associate with local data related to a power source. Welding System 500 includes processing component 125 that receives inputs via input device 112 and additional input device 510. Input device 510 is utilized by one or more users 504, 506 in which each user can receive inputs to associate a set of data to a particular welder power source or a portion of weld data from a particular welder power source. Input device 112 collects and/or receives input based on indicia from user 502. It is to be appreciated that user 502 can be with a same welding environment in comparison to users 504, 506 or a difference welding environment in comparison to users 504, 506.

As discussed above, a first input based on a first indicia enables processing component 125 to identify a type of a set of data to be delivered and a welder power source to deliver the set of data. Moreover, a second input based on a second indicia enables processing component 125 to identify at least one of a storage location of the set of data or receipt of the set of data (e.g., the set of data located within the second indicia). Processing component 125 associates the set of data with at least one of the target welder power source (e.g., welder power source identified from the first indicia) or a portion of weld data collected from a welding process powered by the target welder power source.

System 500 includes one or more welder power sources such as first welder power source 530, second welder power source 535 to Nth welder power source 540, where N is a positive integer. Each welder power source can include local data (e.g., also referred to as weld data) particular to a welding process power is supplied therefrom. Additionally, each welder power source can include set of data from input, wherein the set of data from input is from the second input based on the second indicia. Thus, first welder power source 530 includes local data 545 from a welding process and set of data from input 550, wherein set of data from input 550 is based on a first indicia identifying first welder power source 530 and set of data 550 being identified from a second indicia. Similarly, second welder power source 535 includes local data 555 from a welding process and set of data from input 560, wherein set of data from input 560 is based on a first indicia identifying second welder power source 535 and set of data 560 being identified from a second indicia. Similarly, Nth welder power source 540 includes local data 565 from a welding process and set of data from input 570, wherein set of data from input 570 is based on a first indicia identifying Nth welder power source 540 and set of data 570 being identified from a second indicia.

It is to be appreciated that local data 545, 555, and 565 can be stored in each respective welder power source (as depicted), in local data store, in a remote data store, in data store 520, or a combination thereof. For instance, data store 520 stores local data 522 in which local data 522 includes at least a portion of local data 545, 555, 565. In another example, data store 520 stores set of data from input 524 in which set of data from input 524 includes at least a portion of set of data from input 550, 560, 570. A "data store" or "memory" can be, for example, either volatile memory or nonvolatile memory, or can include both volatile and non-volatile memory. The data store of the subject systems and methods is intended to comprise, without being limited to, these and other suitable types of memory. In addition, the data store can be a server, a database, a hard drive, a flash drive, an external hard drive, a portable hard drive, a cloud-based storage, and the like.

Figure 6:
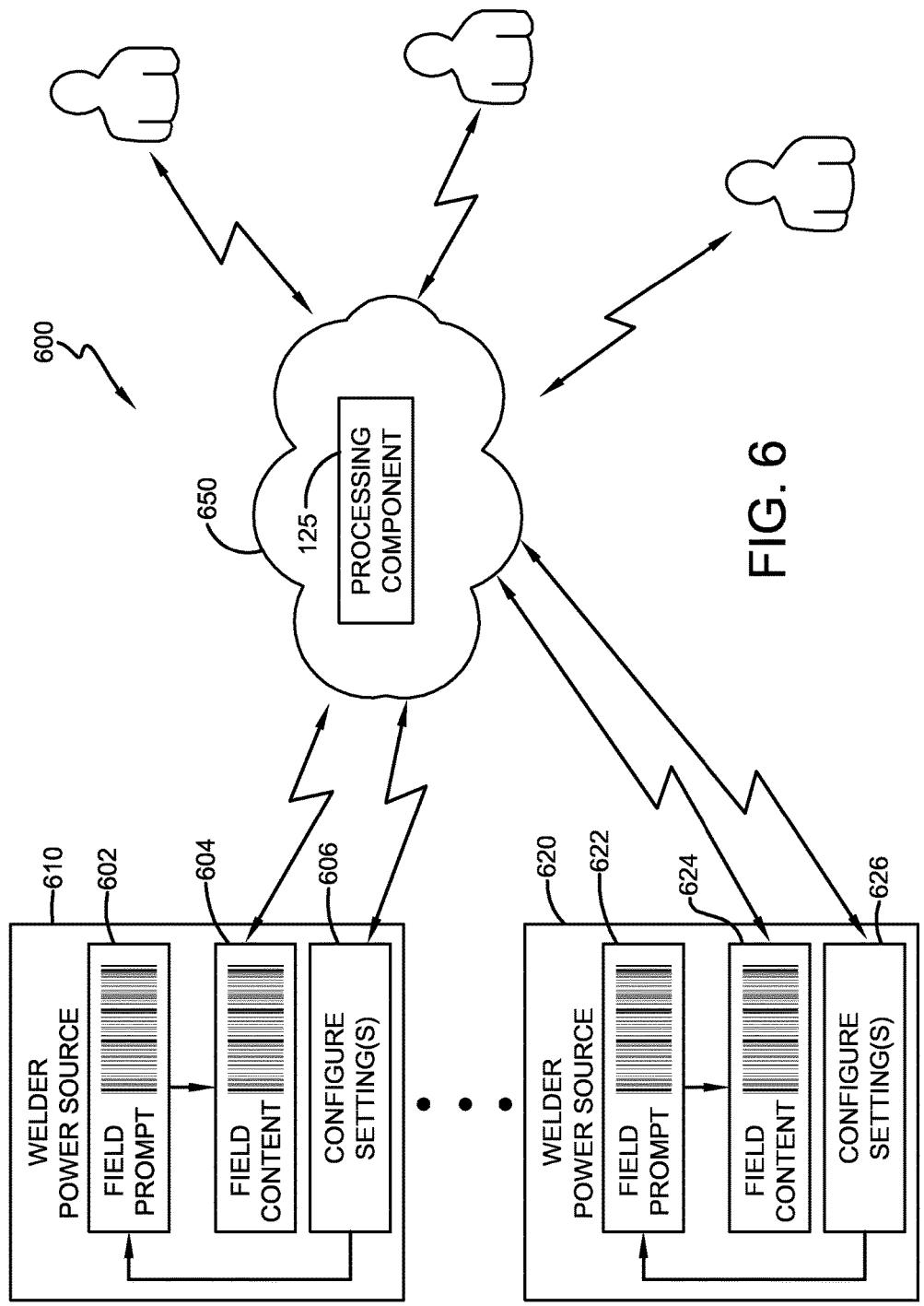
FIG. 6 is a block diagram illustrating a welding system that includes a first indicia to identify a type of a set of data and a second indicia to identify a location of the set of data.

FIG. 6 illustrates welding system 600 that includes a first indicia to identify a type of a set of data and a second indicia to identify a location of the set of data. System 600 is employed to facilitate welding system setup by scanning one or more indicia. The following example relates to an indicia that is a barcode and is used solely for example and is not to be seen as limiting on the subject innovation. In particular, it is to be appreciated and understood that any suitable indicia can be utilized. In this example, welder power sources 610, 620 each have a plurality of configurable parameters that are adjusted to accommodate various weld operations. Such parameters can include units of measure, sense lead setup, work point in trim/volts or wfs/amps, wire feed speed, current, and other suitable parameters. In order to provide straightforward data entry that does not require the use of a keyboard/mouse, a barcode scanner can be employed along with a sheet of barcodes. The subject embodiments provide an advantage over conventional systems as an industrial welding environment is generally unsuitable for the operation of input devices such as a mouse, keyboard or other mechanically intensive components. In contrast to these devices, barcode scanners are generally hermetically sealed and able to withstand harsh environmental conditions. Moreover, barcode scanner use does not require operator interaction beyond aiming and pulling a trigger, which simplifies input into system 600. Moreover, input errors can be mitigated as the operator simply selects an appropriate input from a barcode sheet in place of entering a series of keys and/or mouse clicks.

In this example, a first sheet can include prompts, as provided in field prompts 602, 622, to signal that data for a particular field will be entered subsequently. Other sheets can include the barcodes for the such fields, wherein data is entered upon scanning of the field content 604, 624. In this manner, a first barcode (field prompt 602, 622) is scanned to prompt insertion of data into a field. A second barcode (field content 604, 624) is then scanned to insert said data. For this purpose, a bar code scanner (e.g., one or more bar code scanner or input device) can be coupled to each welder power source (e.g., via a hardwire or wireless protocol).

Once the second barcode is scanned, it is sent to a local or cloud database (e.g., local database, cloud database, remote database, among others) computing platform 650 for processing via processing component 125. In an embodiment, the second barcode is correlated to particular job data and/or weld system presets to setup various aspects of the welding machine. A lookup table or other suitable component can be employed to facilitate this correlation between the bar code and rule sets, which are preconfigured and stored for subsequent retrieval from the local or cloud database (e.g., local database, cloud database, remote database, among others). The rule sets and/or parameter values are then transmitted down from the local or cloud database (e.g., local database, cloud database, remote database, among others) to the respective welder power source to configure settings at 606, 626. This process can be repeated as necessary to register/configure each welder power source, identify a user, manage access to a user, identify actions by a user, and to set values for substantially any parameter associated with the welder power source. In an embodiment, the field prompt and field code is populated using only local resources, such as an onboard memory. In this example, it is unnecessary to request and receive information from a remote source.

In another example, field content 604, 624, can relate to consumable type with welder power source 610, 620. In an embodiment, a barcode associated with the consumable (e.g., lot number) is read to automatically set up an entire welding power system. Quality information can also be downloaded that are related to each lot code, wherein a quality certificate is generated via a web application. Such information can include lot code controlled chemistry, specially designed chemistry, or other information specific to a particular lot of consumables. In an example, an active link is be presented to a user, which is employed to retrieve a quality certificate. In this manner, a user can identify specific consumable lots for each weld to facilitate enhanced quality control.

With the various types of the set of data and the various sets of data (e.g., referenced above in FIG. 1, for instance), processing component 125 can create a command sheet. Processing component 125 can provide a configurable application with setup wizard(s) or widget(s) that allow setup of the command sheet with specific options/commands (See FIG. 1) desired for a welder power source or a work station using a welder power source.

Figure 7:
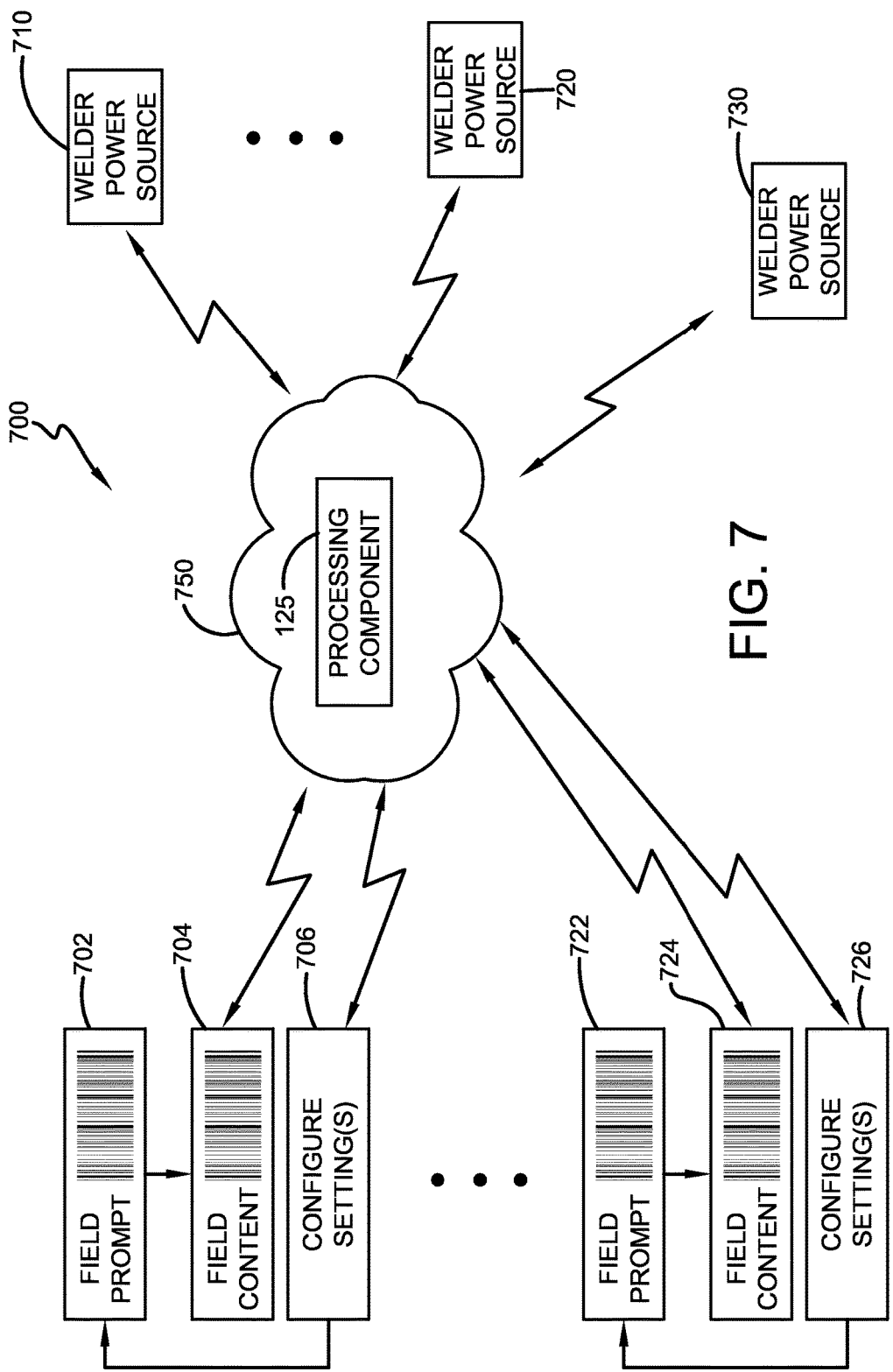
FIG. 7 is a block diagram illustrating a welding system that communicates one or more sets of data to one or more welder power sources based on one or more indicia.

FIG. 7 illustrates welding system 700 that communicates one or more sets of data to one or more welder power sources based on one or more indicia. System 700 illustrates an embodiment associated with the subject innovation that is employed in a system-wide basis. System 700 includes one or more centralized scanning locations within a facility that are employed to download information on an enterprise-wide basis. For instance, scanning a field prompt at a central location can be employed to download appropriate setup data for each welder power source within an entire system (e.g., a factory floor, manufacturing sector, etc.). Field prompt 702, 722 at a central scanning (e.g., central input) location is used to prompt field content 704, 724, which can populate local or remote database within computing platform 750. Once received, settings 706, 726 can be configured and uploaded to one or more welder power sources 710, 720, 730. This architecture provides an elegant solution to configure a plurality of welder power sources efficiently, wherein data is managed for implementation on an enterprise-wide scale.

In another embodiment, power sources can generate one or more field prompt bar codes that are related to particular aspects of system configuration. For example, when placing a power source online for the first time, a user can walk through a series of menus, graphics, etc. to review and select different aspects of the power source that a user would like to configure. In an example, based on such selections, a single field prompt bar code is generated that is employed to modify one weld source parameter. In another example, a single field prompt bar code is generated to modify a plurality of power source parameters within a set. By generating field prompt bar codes, each power source can serve as a self-contained resource for the use of bar codes for parameter configuration.

Bar code scanning can also be used to identify weld system users and to enable/disable weld system functionality based upon a privilege set associated with each user. In one example, only a particular user (line manager) can reset a fault condition on the weld system. This event and user are both logged to the local or cloud database (e.g., local database, cloud database, remote database, among others). In another example, once a welder power source is registered, it can print a barcode that identifies that equipment. That barcode is then used to configure scanning apps to accept further input for that specific machine. This information, in turn, is used to control one or more parameters associated with operation of the welder power source such as current delivery, timing, distance, wire feed rate, and other applicable variables.

With the various types of the set of data and the various sets of data (e.g., referenced above in FIG. 1, for instance), processing component 125 can create a command sheet. Processing component 125 can provide a configurable application with setup wizard(s) or widget(s) that allow setup of the command sheet with specific options/commands (See FIG. 1) desired for a welder power source or a work station using a welder power source.

Figure 8:
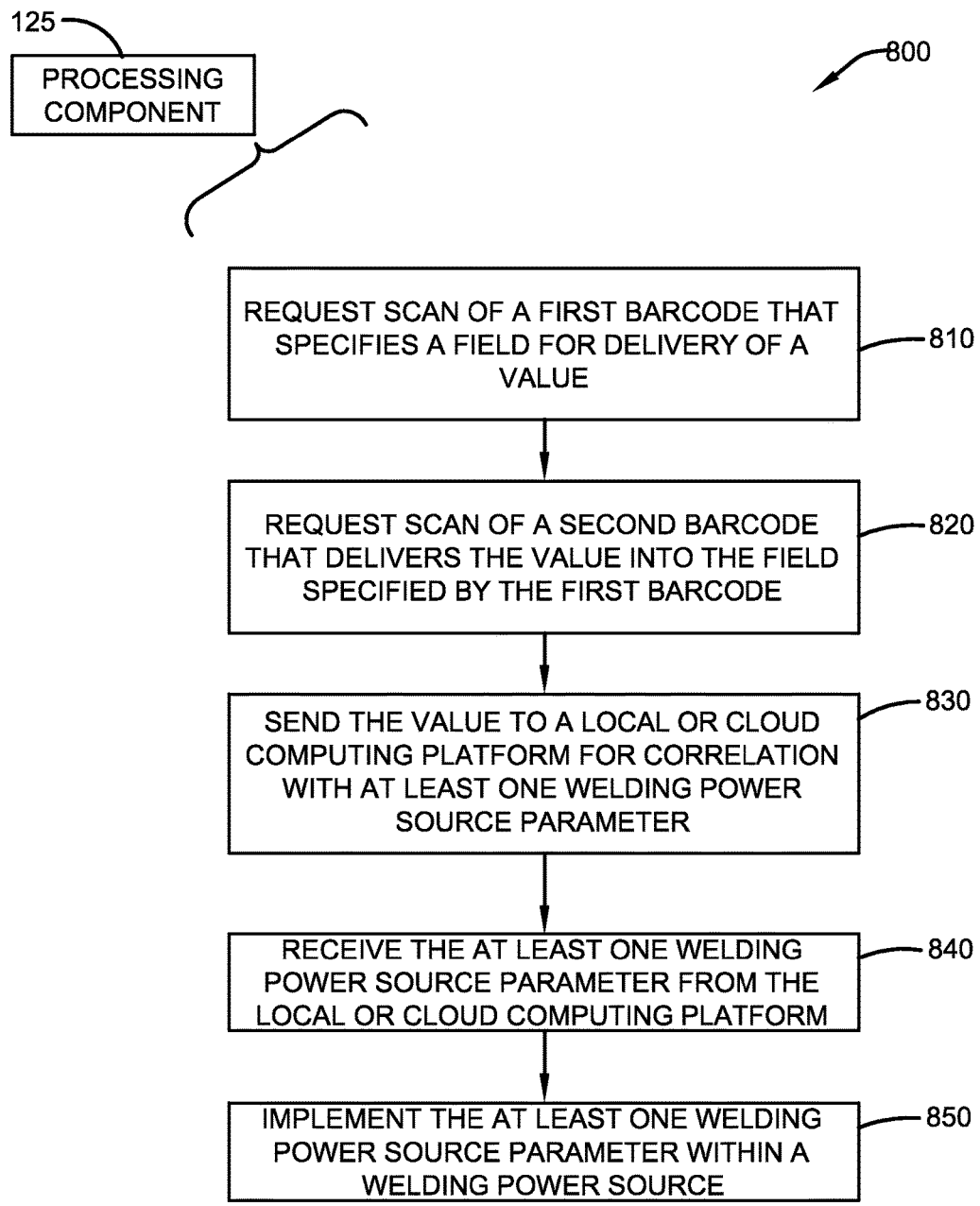
FIG. 8 is a flow diagram of utilizing a set of data with a power source in which one or more indicia identified a type of the set of a data and the set of data.
Figure 9:
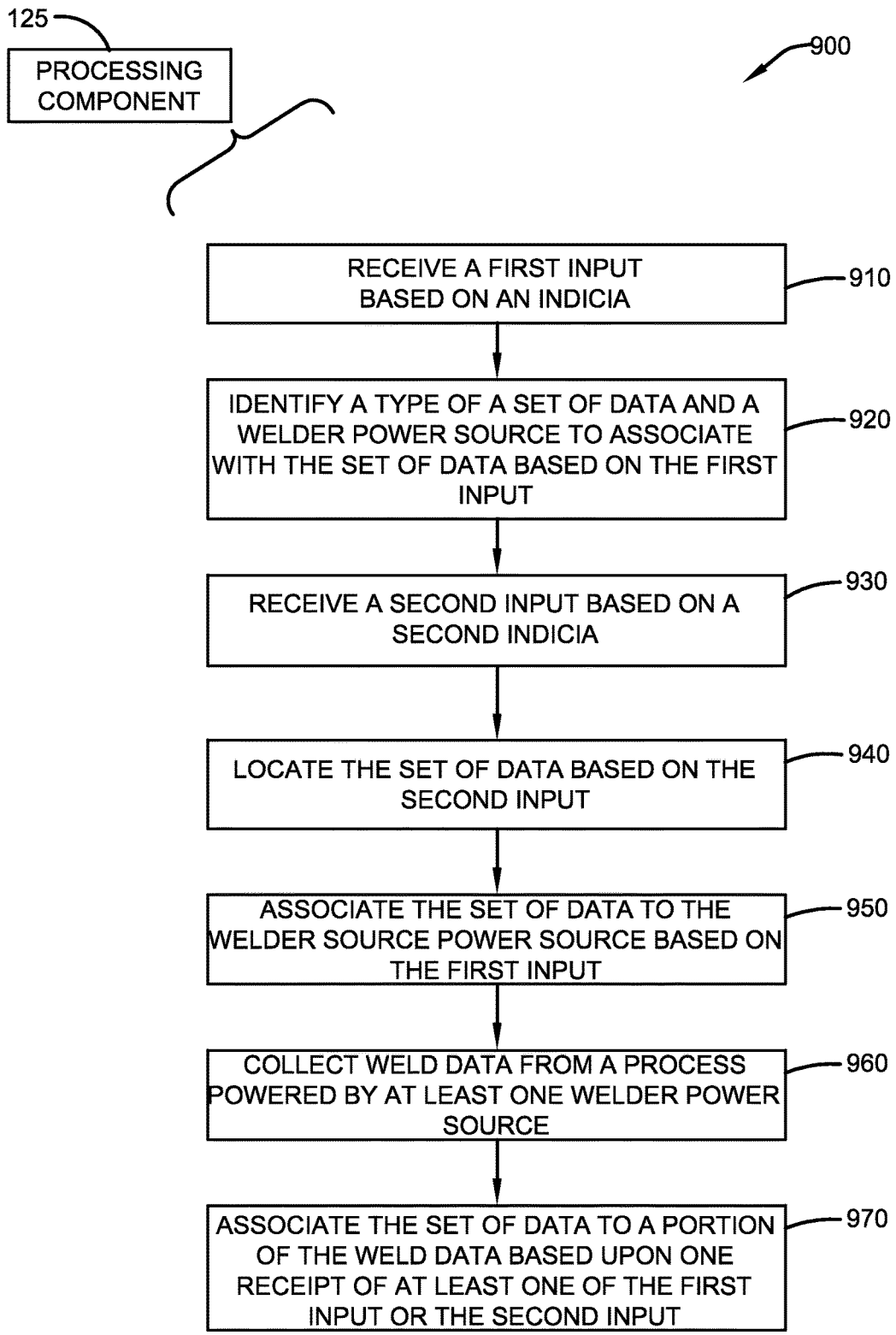
FIG. 9 is a flow diagram of communicating a set of data to a welder power source based on a first indicia and a second indicia.

In view of the exemplary devices and elements described supra, methodologies that may be implemented in accordance with the disclosed subject matter will be better appreciated with reference to the flow charts and/or methodologies of FIGS. 8 and 9. The methodologies and/or flow diagrams are shown and described as a series of blocks, the claimed subject matter is not limited by the order of the blocks, as some blocks may occur in different orders and/or concurrently with other blocks from what is depicted and described herein. In an embodiment, a first input can be received prior to a second input (as described below). In another embodiment, a second input can be received prior to a first input. In an embodiment, the a first input and a second input can be received at substantially the same time. Moreover, not all illustrated blocks may be required to implement the methods and/or flow diagrams described hereinafter.

Sequentially, the following occurs as illustrated in the decision tree flow diagram 800 of FIG. 8 which is a flow diagram 800 that utilizes a set of data with a power source in which one or more indicia identified a type of the set of a data and the set of data. Methodology 800 implements one or more parameters within welder power source. A scan of a first barcode specifies a field for delivery of a value (reference block 810). A scan of a second barcode can be requested that delivers the value into the field specified by the first barcode (reference block 820). Once complete, the value is sent to a local or cloud database (e.g., local database, cloud database, remote database, among others) and/or computing platform (e.g., remote computing platform, local computing platform, cloud computing platform, combination thereof), wherein the value is correlated to (e.g., associated to, related to, etc.) at least one welder power source parameter (reference block 830). The at least one welder power source parameter is received from the local or cloud database (e.g., local database, cloud database, remote database, among others) and/or computing platform (e.g., remote computing platform, local computing platform, cloud computing platform, combination thereof) (reference block 840).

The at least one welder power source parameter is implemented within a welder power source (reference block 850). For instance, such parameters can be related to system identification, user identification, product/consumable quality, and/or settings related to operation of the welder power source.

The following occurs as illustrated in the flow diagram 900 of FIG. 9. Flow diagram 900 relates to communicating a set of data to a welder power source based on a first indicia and a second indicia. A first input is received based on an indicia (reference block 910). For instance, the first input can be from an input device such as, but not limited to, a barcode scanner, a scanner, a camera, a barcode reader, a numeric detector (e.g., optical character recognition device), a microphone, and the like. By way of example and not limitation, the indicia can be a barcode (e.g., a two-dimensional barcode, a three-dimensional barcode, a Quick Response (QR) code, a combination of black and/or white graphics that can be scanned, among others), a radio frequency identification (RFID) signal, a biometric, a magnetic strip reader, a serial number, a wireless signal, among others. A type of a set of data and a welder power source to associate with the set of data is identified based on the first input (reference block 920). For instance, a first barcode can be scanned or read in which the first barcode can identify a type of a set of data that is to be received (e.g., incoming set of data) and a welder power source to associated the set of data (e.g., target welder power source).

A second input is received based on a second indicia (reference block 930). For instance, the second indicia can be read or scanned or received in which the second indicia is the second input received by, for instance, an input device. The set of data is located based on the second input (reference block 940). For instance, the set of data can be located within the second input (e.g., the receipt of the second indicia can be the set of data). In another instance, the set of data can be defined by a location identified with the second input (e.g., the second indicia provides a location where the set of data can be accessed).

The set of data is associated to the welder power source based on the first input (reference block 950). In an embodiment, the first input can be a barcode in which the receipt of the first barcode via an input device can associate the set of data to the welder power source defined in the first barcode. Weld data is collected from a weld process powered by at least one welder power source (reference block 960). For instance, each welder power source can collect and/or track "weld data" or "local data" related thereto. The set of data is associated to a portion of the weld data based upon receipt of at least one of the first input or the second input (reference block 970). For instance, the local data or weld data collected by each welder power source can be appended by a set of data identified by at least one of a first input and first indicia or a second input and second indicia.

The method further includes storing the set of data local to the welder power source. The method further includes storing the set of data remote to the welder power source. The method further includes identifying the set of data based on information included within the second indicia. The method further includes identifying the set of data based on a data storage location included with the second indicia. The method further includes the data storage is remote to the welder power source. The method further includes the data storage is local to the welder power source. The method further includes the type relates to at least one of an employee identification (ID), a consumable material for a weld process, a maintenance for a power source, a repair for a power source, an inspection, a welding parameter, or a workpiece parameter. The method further includes collecting weld data from a weld process powered by at least one welder power source. The method further includes associating the set of data to a portion of the weld data based upon receipt of the first input. The method further includes associating the set of data to a portion of the weld data based upon receipt of the second input. The method further includes associating the set of data to the welder power source from the second scan to a time of a receipt of an additional first scan that identifies a type of a set of data and a welder power source to associate with the set of data. The method further includes the association is based on at least one of a tag, a metadata tag, a link, a key, or an appending of data.

In an embodiment, a first indicia (e.g., received or collected as an input) can define a type of a set of data that will be delivered and a target source (e.g., a controller, a processing component, among others). Following such embodiment, a second indicia (e.g., received or collected as an input) can include the set of data and communicate the set of data to the target source. For instance, the set of data can be communicated and/or utilized by a controller for a welder power source based on the first received indicia and the second received indicia. By way of example and not limitation, a controller for a welder power source can include one or more steps related to a particular welding process for a specific workpiece. For instance, a first workpiece can include steps A, B, C, and D based on welding parameters desired, the welding process used, and/or the workpiece. In another example, a second workpiece can include steps B, C, A, E, and F. With the employment of indicia, the controller implementing the steps for the welding process via the welder power source can be managed and/or instructed. For instance, the indicia can indicate at least one of the following: which steps to perform, redo a step, skip a step, pause a sequence of steps, among others. Furthermore, the controller can control one or more welder power sources associated with one or more welding processes.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A method, comprising the steps of:
   (a) accessing a command sheet which includes a plurality of first indicia, wherein each individual first indicia is one of a barcode, a QR code, or a radio frequency identification signal;
   (b) reading one of the plurality of first indicia using an input device, wherein the step of reading the first indicia identifies a particular field for which a portion of data that will be entered subsequently for the particular field, the particular field is one of a job data, an identity of a welder power source, or an identity of a user;
   (c) reading a second indicia using the input device, the step of reading the second indicia identifies the portion of data and the second indicia is one of a barcode, a QR code, or a radio frequency identification signal, the portion of data corresponds to the particular field identified by the reading of the first indicia;
   (d) communicating the portion of data to at least one of a database, a workstation at which a welding operation is performed, or a welding power source used to perform a welding operation; and
   (e) configuring the welding power source or the workstation with the portion of data for the particular field, the particular field is identified from the step of reading the first indicia and the portion of data is identified from the step of reading the second indicia.

2. The method of claim 1 wherein the input device is a barcode scanner.

3. The method of claim 1 further comprising the step of associating the user's identification to at least one of the welder power source and a portion of weld data collected by the welder power source.

4. The method of claim 1 wherein the welder power source prints an identification barcode.

5. The method of claim 1 wherein after reading the first indicia corresponding to job data, the subsequent second indicia is correlated to at least one of particular job data and weld system presets to setup the welder power source.

6. The method of claim 5 wherein the second indicia is correlated using a lookup table for retrieving data from the database.

7. A system comprising:
   a command sheet which includes a plurality of first indicia, wherein each individual first indicia is one of a barcode, a QR code, or a radio frequency identification signal;
   at least one welder power source that interfaces to an input device via a database, wherein the input device reads a first indicia selected from the plurality of first indicia on the command sheet, wherein reading the first indicia identifies a particular field for which a portion of data that will be entered subsequently for the particular field, the particular field is one of a job data, an identity of a welder power source, or an identity of a user;
   the input device reads a second indicia, reading the second indicia identifies the portion of data and the second indicia is one of a barcode, a QR code, or a radio frequency identification signal, wherein the portion of data corresponds to the particular field identified by the reading of the first indicia; and
   a processing component that sends the portion of data to the database.

8. A method, comprising the steps of:
   (a) identifying a user by scanning a biometric;
   (b) accessing a command sheet which includes a plurality of first indicia, wherein each individual first indicia is one of a barcode, a QR code, or a radio frequency identification signal;
   (c) reading one of the plurality of first indicia using an input device, wherein the step of reading the first indicia identifies a particular field for which a portion of data that will be entered subsequently for the particular field, the particular field is one of a job data, an identity of a welder power source, or an identity of a user;
   (d) reading a second indicia using the input device, the step of reading the second indicia identifies the portion of data and the second indicia is one of a barcode, a QR code, or a radio frequency identification signal, the portion of data corresponds to the particular field identified by the reading of the first indicia;
   (e) communicating the portion of data to at least one of a database, a workstation at which a welding operation is performed, or a welding power source used to perform a welding operation; and
   (f) configuring the welding power source or the workstation with the portion of data for the particular field, the particular field is identified from the step of reading the first indicia and the portion of data is identified from the step of reading the second indicia.

9. The method of claim 8, wherein the input device is a barcode scanner.

10. The method of claim 8, wherein the command sheet includes a welding operation that uses the welding power source.

11. The method of claim 8, wherein the database is remote to the welding power source.

12. The method of claim 8, further comprising collecting welding data from a welding operation performed by the welding power source.

13. The method of claim 12, further comprising associating the portion of data with at least a portion of the welding data based on at least one of the first indicia or the second indicia.

14. The method of claim 13, wherein the associating is formed via at least one of a tag, a link, a key, or an appending of data.

15. The system of claim 7, wherein the input device is a barcode scanner.

16. The system of claim 7, wherein the command sheet includes a welding process that uses the at least one welder power source.

17. The system of claim 7, wherein the database is remote to the at least one welder power source.

18. The system of claim 7, wherein the at least one welder power source is configured to collect welding data from a welding process performed by the at least one welder power source.

19. The system of claim 18, wherein the system is configured to form an association between the portion of data and at least a portion of the welding data based on at least one of the first indicia or the second indicia.

20. The system of claim 19, wherein the association is formed via at least one of a tag, a link, a key, or an appending of data.

* * * * *